United States Patent [19]

Ripani et al.

[11] Patent Number: 4,688,177

[45] Date of Patent: Aug. 18, 1987

[54] CHOCOLATE FEEDING DEVICE FOR CHOCOLATE REFINERS

[75] Inventors: Sergio Ripani; Giulio Serafini, both of Milan, Italy

[73] Assignee: Carle & Montanari S.p.A., Milan, Italy

[21] Appl. No.: 731,156

[22] Filed: May 6, 1985

[30] Foreign Application Priority Data

May 10, 1984 [IT] Italy .................. 20862 A/84

[51] Int. Cl.[4] .................. G06F 15/46; B02C 25/00
[52] U.S. Cl. .................. 364/468; 364/148; 99/489; 99/486
[58] Field of Search .................. 364/148, 152–153, 364/183, 188, 468–469, 500, 502, 552; 426/631; 99/485–486, 489, 493; 425/437

[56] References Cited

U.S. PATENT DOCUMENTS

| | | | |
|---|---|---|---|
| 4,076,482 | 2/1978 | Whetstone | 425/437 |
| 4,129,159 | 12/1978 | Whetstone | 425/437 X |
| 4,389,427 | 6/1983 | Schmitt et al. | 426/631 |
| 4,440,797 | 4/1984 | Berkes et al. | 426/631 X |
| 4,519,304 | 5/1985 | Ripani | 99/489 |

Primary Examiner—Gary V. Harkcom
Attorney, Agent, or Firm—Stefan J. Klauber

[57] ABSTRACT

A chocolate feeding device for chocolate refiners which has a chocolate feeding conveyor provided with movable pick-up blades feeding the chocolate to several points in an adjacent refiner feeding hopper which cooperates with an electric cell, the output of which is representative of the chocolate quantity in said feeding hopper. The feeding hopper is provided with an oscillable shield-like bottom wall the movements of which are controlled by a pneumatic cylinder/piston unit connected to it and controlled in turn by an actuator having a circuit controlled by an oscillable front wall of a chocolate-receiving chamber of the chocolate refiner.

3 Claims, 12 Drawing Figures

CHOCOLATE FEEDING DEVICE FOR CHOCOLATE REFINERS

BACKGROUND OF THE INVENTION

This invention relates to a chocolate feeding and control system for chocolate refiners.

As is known in the art, chocolate refiners have the function of "rolling" the chocolate paste being fed in in order to impart to it a desired fineness. This is selected according to the intended final use of the chocolate in a variety of different products. Measuring the fineness of the chocolate film being delivered by the refiners presents considerable difficulties and is generally carried out in an empirical fashion.

Italian Patent Application No. 20 718 A/83 (U.S. Pat. No. 4,519,304) by this Applicant discloses a device for adjusting and monitoring the thickness of the film being delivered by refiners, which enables the achievement of fineness grades which are required and preset. With that device, it is possible to directly adjust a refiner so as to maintain set fineness values.

With conventional refiners, not only is fineness control achieved through an empirical and unreliable procedure, but no provision is made for controlling the effective production rate of the machine. With prior refiners, moreover, the chocolate paste is fed from the conveyor by means of a removal blade operated with a knife-like action and set for oscillation in a vertical plane, and the chocolate is introduced into the hopper at its middle. This creates peak or heaped areas at the middle, and accordingly, different depths which lead to irregular filling, which is reflected in the filling chamber which is provided with the feed roll pair.

Furthermore, with prior refining machines, the feed chamber includes a capacitive sensor for sensing the minimum and maximum levels of the chocolate. These sensors operate erratically owing to the formation of incrustations. This results in untimely filling of the chamber, so that, in the event of the minimum levels being too low, hollows or pockets are formed close to the second roll in the feed roll pair, which pockets may create objectionable "dry zones or bands" or uneven thickness in the chocolate film being formed.

SUMMARY OF THE INVENTION

It is the aim of this invention to provide a chocolate feeding and control system for chocolate refiners, which can obviate the drawbacks mentioned in the foregoing and indicate both the machine effective output over a desired time period as well as the true fineness of the chocolate film being delivered.

In a feeding system for chocolate refiners comprising means of picking up the chocolate from the feeding conveyor, a feeding hopper on the feed roll pair, a means of determining the amount of chocolate in the receiving chamber of the feed roll pair, and means indicating the minimum and maximum levels of the chocolate within the hopper, the aim underlying this invention is achieved by a feeding and control system which is characterized in that:

the chocolate pick-up means are adapted to provide for the hopper to be filled without the formation of peaks or heaped areas on the upper side of the chocolate;

the hopper is associated with an electric load cell;

the sensor means sensing the minimum and maximum levels of the chocolate in the chamber of the feed rolls are oscillating depth built; and an indicator device is provided with an indicator of the value of the amount of chocolate being fed into the hopper and an indicator of the value of the time interval for the feed considered, as well as a computer for processing such stored values and data, being representative of a set constant, depending on the length of the refining rolls, speed of the refiner, and the refiner itself considered each time, to directly express in addition to the refiner output also the true fineness of the chocolate film being delivered.'

According to the invention, the chocolate pick-up means consist of two oscillatable blades spaced apart by a distance approximately equal to one half the length of the hopper, said blades being alternately raised for presettable time periods so as to cause alternate filling of a first half of the hopper, then the other half, and so on.

According to the invention, moreover, the means for picking up the chocolate consist of a single blade mounted on a screw nut slider received on a moving screw mounted substantially opposite to the hopper and associated with a reversible motor, as well as with a travel limit stop for reversal of the movement, the hopper being loaded in alternately deposited stacked layers.

The chocolate pick-up means may advantageously consist of two spaced blades, the farther one in the chocolate feeding direction spans the full width of the conveyor while the other spans substantially the half-width of the conveyor and is mounted preferably for translation on a slotted strip cross support.

According to the invention, moreover, associated with the rear end of the hopper holding arm or crosspiece is an electric load cell the output current whereof, representing the weight of the chocolate in the hopper, is supplied to a digital indicator of the weight of the chocolate in the hopper.

The means of detecting the minimum and maximum levels of the chocolate in the receiving chamber of the feed rolls adavantageously consist of an oscillating front wall working against elastic spring means between an inward position, corresponding to the minimum level of the chocolate, and an outwardly swung position, corresponding to the maximum level of the chocolate, such positions also corresponding to an open or closed position of an electric contact causing, through intervening control means, the shield on the bottom side of the hopper to be opened or closed. The hopper shield opening and closing means consist advantageously of a double-acting cylinder-piston unit.

The minimum and maximum level signals used to control the operation of the chocolate pick-up blades to feed in chocolate are taken according to the invention from the electric current supplied by the load cell to the digital indicator of the weight of the chocolate being fed.

With the monitoring system and device proposed for feeding and controlling chocolate being fed and delivered according to the invention one can adjust in a faultless way the amount of chocolate delivered to the refiner, on the one side, and on the other side, obtain directly an indication of both the amount of chocolate actually produced and of the true fineness of the chocolate fiml being delivered. A further advantage of the system proposed resides in the simple construction both of the various parts of the system directly affected by the chocolate displacement, and of the data processing device indicating the output and fineness of the chocolate film being delivered.

Refiners incorporating the system of this invention will operate, therefore, more smoothly and evenly, and permit direct reading of their effective outputs and true fineness of the film produced.

BRIEF DESCRIPTION OF THE DRAWINGS

Further constructional details, features, and advantages of the system according to the invention will be apparent from the following description with reference to the accompanying drawings showing the different parts of the proposed system in preferred embodiments thereof, given herein by way of example and not of limitation. In the drawings.

Throughout the drawing figures, although shown at different scales, like or conceptually similar parts are denoted with the same reference characters.

DESCRIPTION OF THE PREFERRED EMBODIMENTS

Figure 1:
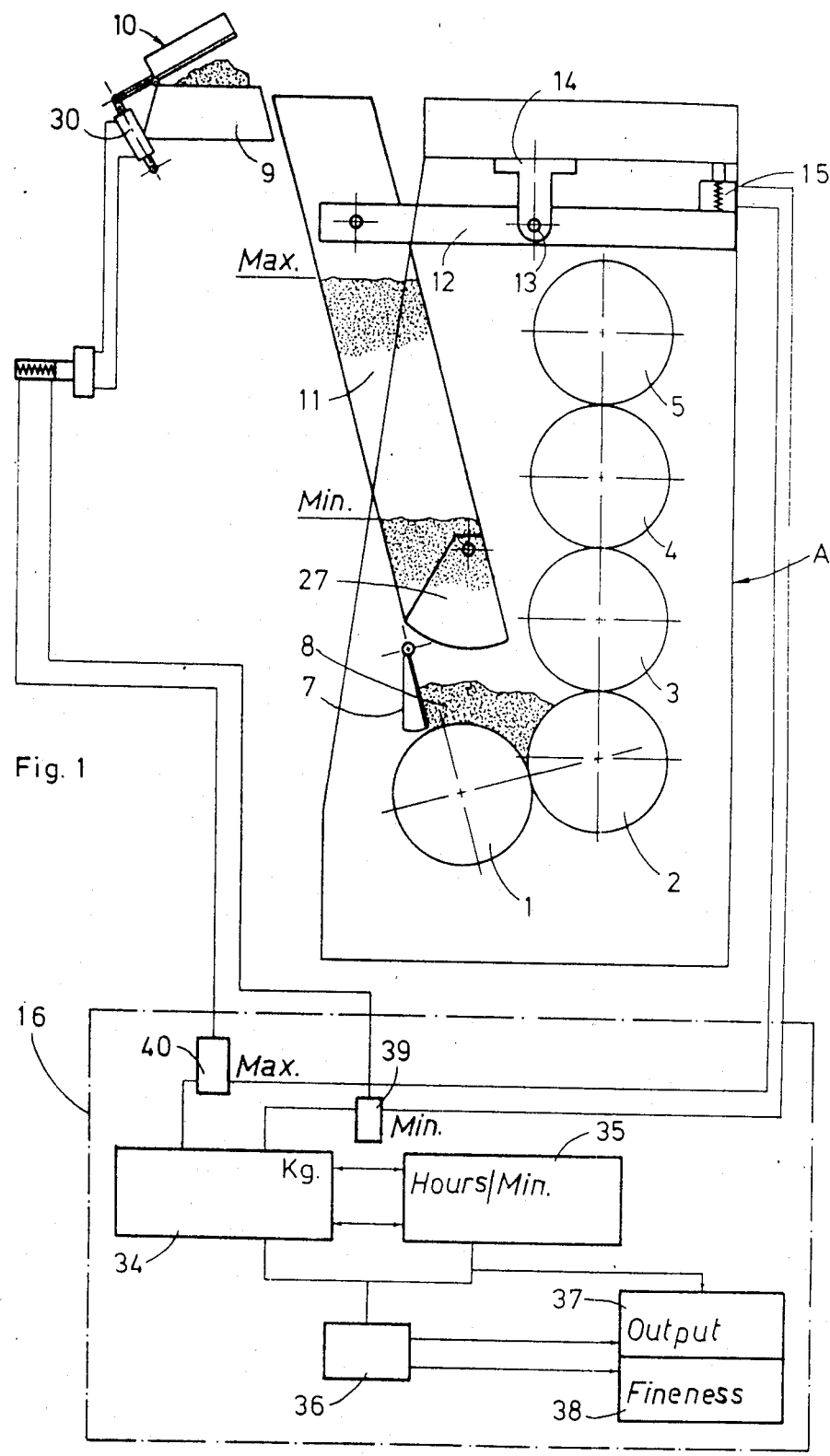
FIG. 1 is a schematical general view of a refining machine incorporating the system of this invention.

The refining machine is schematically indicated generally at A. The same comprises a pair of feed rolls 1,2 and precisely, an inlet roll 1 and further feeding-refining roll 2. Indicated at 3,4 and 5 are the refining rolls proper, of which the roll 5 is the delivery roll. Located at the ends of the feed rolls 1 and 2 are confining uprights 6 which define, in combination with the oscillating front wall 7, the chocolate receiving chamber 8 of the feed roll pair 1 and 2. The chocolate to be refined is delivered on a conveyor 9 which, in general, simultaneously supplies other refiners as well. The chocolate being conveyed as described above is picked up by pick-up means, generally indicated at 10. From the conveyor 9, the chocolate is conveyed into the hopper 11, which is carried on end cross-members 12, hingedly connected at 13 to a stationary support 14. The free ends of the cross-members 12, cooperate with an electric load cell 15 of a construction known per se. The data processing device of this invention, for indicating the amount being produced and fineness of the delivered film, is generally indicated at 16.

Figure 2:
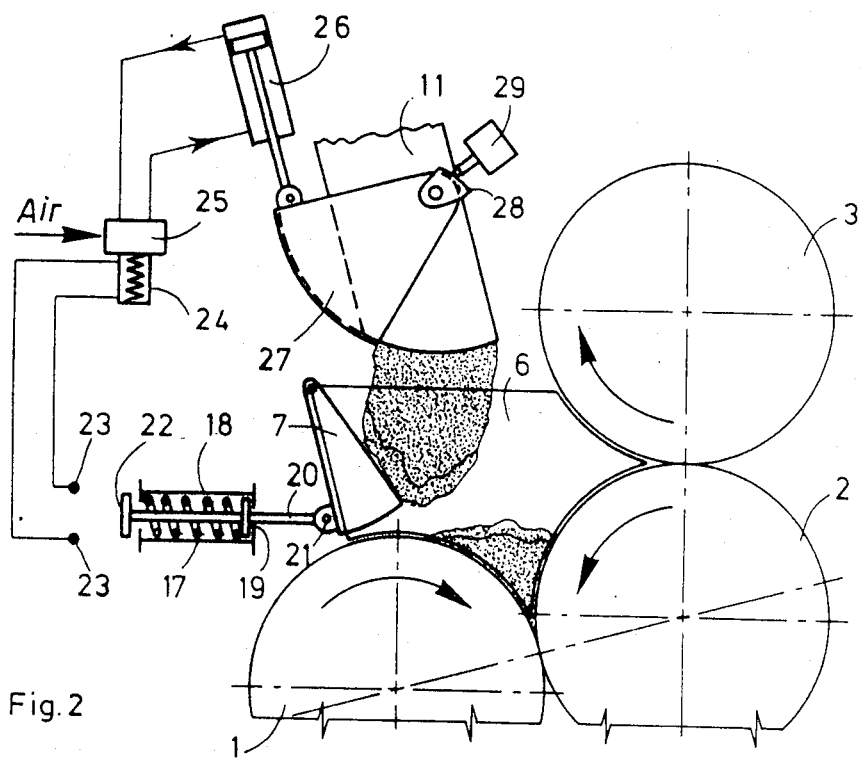
FIGS. 2 and 3 are two side views showing the pair of feed rolls with the hopper and fluctuating depth in the chocolate receiving chamber of the feed rolls, and precisely, in FIG. 2 at an intermediate filling stage and in FIG. 3 in the filled position.
Figure 3:
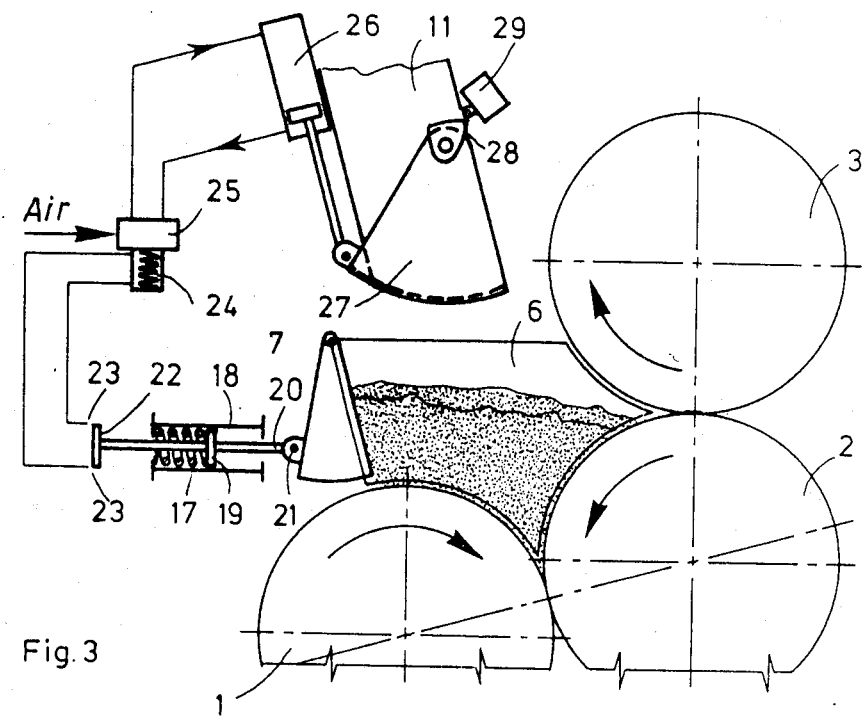
Figure 4:
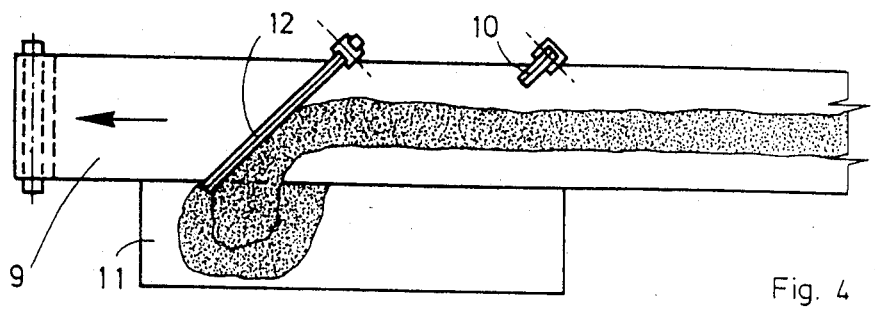
FIGS. 4,5 and 6 are two top views and a front elevation view of the chocolate conveyor and hopper, showing a first embodiment of the pick-up blades.
Figure 5:
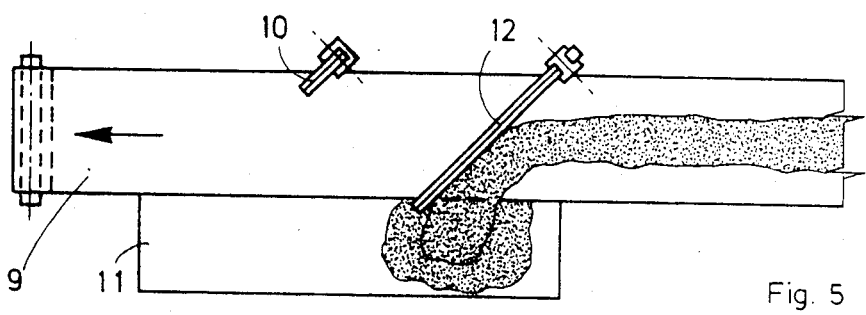
Figure 6:
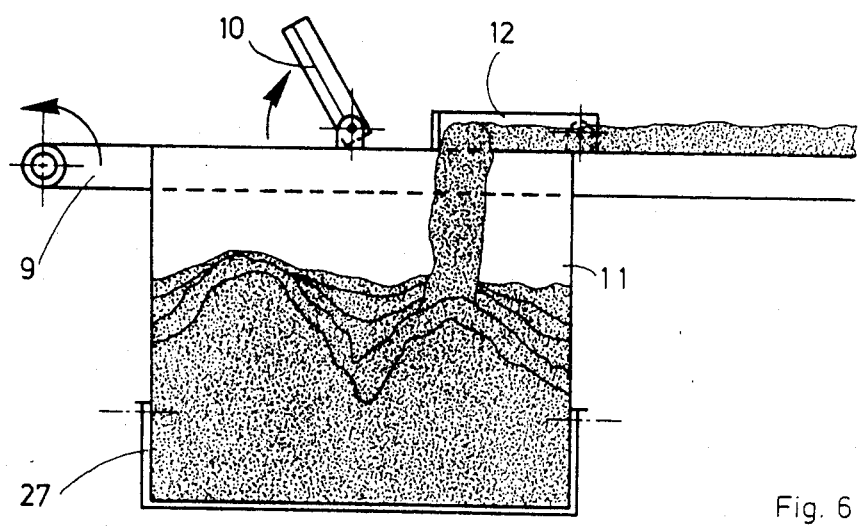
Figure 7:
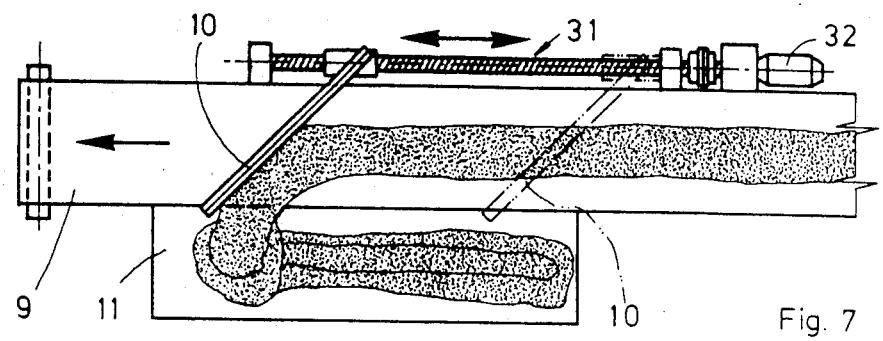
FIGS. 7,8 and 9 are likewise two top views and one front elevation view showing a modified embodiment of the means for picking up the chocolate from its conveyor.
Figure 8:
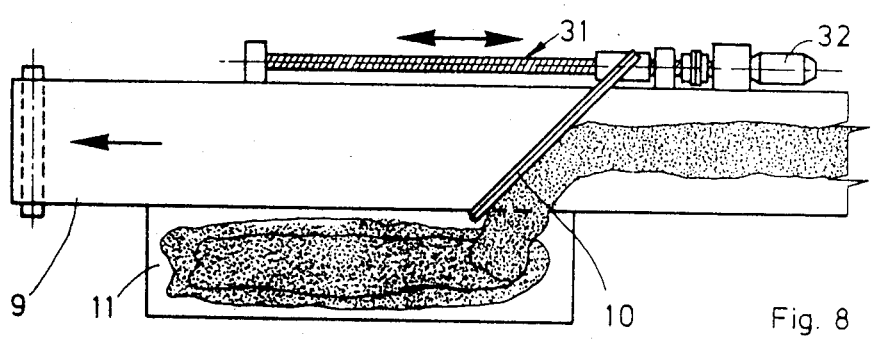
Figure 9:
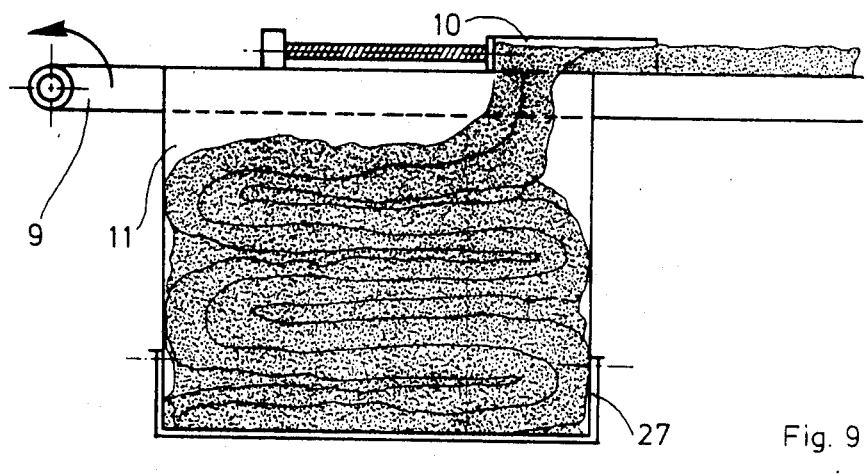
Figure 10:
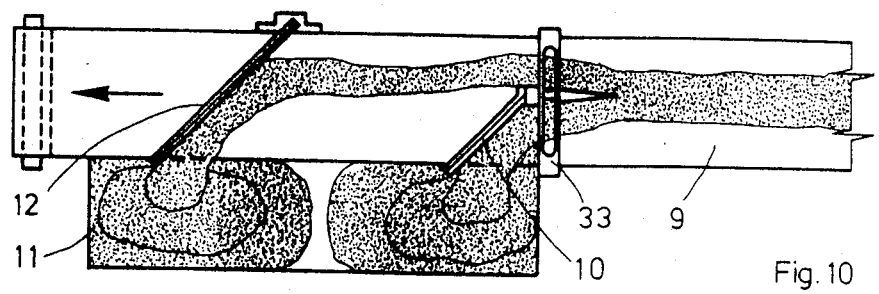
FIGS. 10,11 and 12 are respectively a top view, front elevation view, and side elevation view of a further modified embodiment of the chocolate pick-up means.
Figure 11:
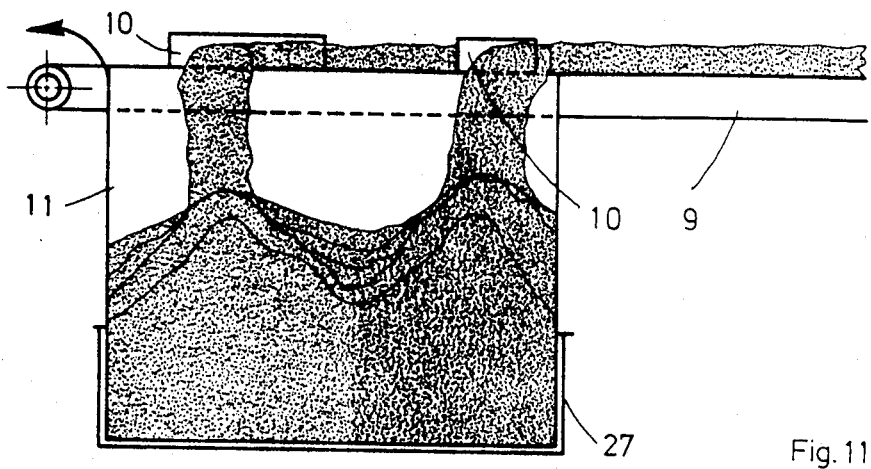
Figure 12:
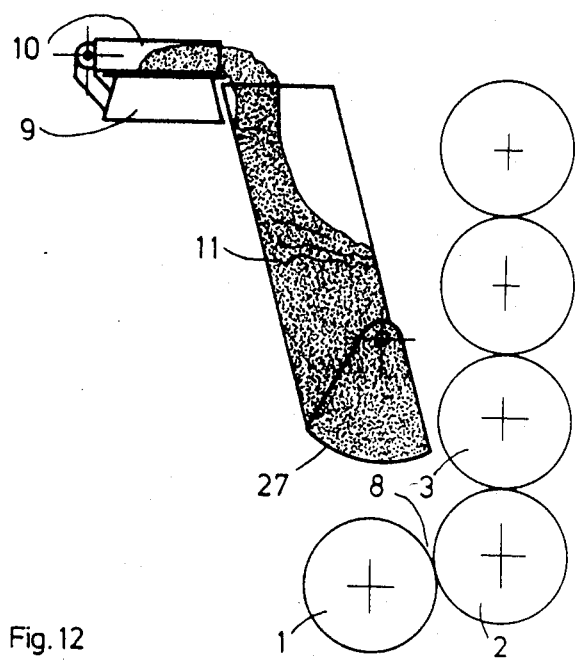

As shown in FIGS. 2 and 3, in particular, the oscillating wall 7 of the receiving chamber 8 is resisted, in its opening movement, by a pressure spring 17 housed in a case 18 and engageable by a disk-like detent 19 mounted on a rod 20 journalled at 21 to the oscillating wall and having, at its opposite end, and electric contact 22. The same cooperates with fixed contacts 23 to close an electric circuit of a solenoid valve 24 of a pneumatic actuator 25 to control the opening and closing of a double-acting pneumatic unit 26 to control the oscillatory movement of the shield 27 forming the bottom closure wall of the hopper 11. The side members of said shield perform an oscillator movement controlled by side cams 28 which are associated with a microswitch 29 connected, in a manner not further discussed herein, to said solenoid valve 24 controlling the double-acting unit 26. With reference to FIGS. 4 to 12, the chocolate loading means will be next described. The same are in the forms of blade element 10 mounted oscillatably, as shown in FIG. 1 by means of the cylinder/piston unit 30. In FIGS. 4 to 6, there are provided two blades 10 spaced apart by a distance corresponding approximately to one half the length of the hopper 11, said blades being raised alternately, thereby one half the hopper is alternately filled a first and then a second half. In FIGS. 7 to 9, a single blade mounted on a translation device 31 of the screw type equipped with a reversible motor 32 and travel end stop, not shown, for reversal of motion. With this device the hopper is filled in superimposed layers. In the modified embodiment of FIGS. 10-12, which provides for a filling procedure like that of the embodiment of FIGS. 4-6, two blades are provided, one of which spans the full width of the conveyor 9, and the other only one half of it. Said shorter blade is mounted on slit guide element 33, so that the subdivision of the oncoming chocolate mass can be adjusted as desired. Picking-up takes place simultaneously with both blades 10.

The data indicator and processing device 16 comprises a digital display 34 of the contents in kilograms of the hopper 11, a minute counter 35, and a calculator 36, an output rate indicator 37, and a fineness meter 38. Indicated at 39 and 40 are, respectively, a minimum actuator and maximum actuator.

The operation of the various parts of the system according to the invention will be now described.

The hopper is filled uniformly with the device of FIGS. 4-6 by lowering pick-up blades 10, under control by the unit 30, in turn controlled through the minimum actuator 39. Loading is stopped, through operation of the maximum actuator 40, by swinging up the blades 10. The chocolate is discharged from the hopper 11 into the chamber 8 of the feed rolls 1 and 2 upon the chocolate contained in said chamber 8 reaching its minimum level. Detection of the minimum level takes place, according to the invention, mechanically through the oscillating wall 7. The same is in fact biased by the spring 17 to perform one oscillation toward the interior of the chamber 8, that oscillation being completed when the wall 7 meets with no further resistance from the residual chocolate left in said chamber. In the inwardly oscillated position, the contact 22 is moved aay from fixed contacts 23, which will result in the shield 27 being swung open by the solenoid valve 24, actuator 25, and double-acting unit 26. The chocolate present in the hopper 11 flows down by gravity and causes the front wall 7 to swing outwards, and consequently, the contacts 22 and 23 to close. This brings about closing of the shield 27 and terminates the delivery of chocolate into the chamber 8. The extent of the shield 27 opening movement may be preset through the end cams 28 and microswitch 29, which acts on the solenoid valve 24, and hence, on the double-acting unit 26. Such loading cycles will take place, therefore, irrespectively of any capacitive probes as is current practice.

The operation of the pick-up blades 10 is clearly depicted in the drawing and evident per se. The solutions proposed herein enable even filling of the hopper 11, even where the latter is a very long one, which constitutes the best arrangement for a uniform filling of the underlying receiving chamber 8 of the feed rolls 1,2, even with very long refining rolls, e.g. having a length on the order of 2.5 meters.

The data processing device 16 operates as follows. The load cell 15 supplies the digital weight display 34 with an electric current whose value is proportional to the weight of the chocolate in the hopper 11, the display 34 showing that weight.

The time indicator 35 counts the loading time. By multiplying the weight by the time, the output rate of the machine over the time considered is obtained. This allows elimination of tape scales or like arrangements, or temporary tapping, as known heretofore, which additionally to being inaccurate, do not provide for detection of the large outputs made possible by these refiners. The use of a load cell permits, moreover, through two selectable thresholds of the minimum and maximum values, automatic control of the pick-up blades 10, thus ensuring that the hopper 11 be loaded uniformly with chocolate. On intervention of the minimum actuator 39, the time counter 35 is stopped. If the constant K (dependent on the length of the refining rolls, machine speed, and construction parameters of the refiner being considered) and the output rate of the refiner are known, then the fineness of the chocolate film being delivered can be found by calculating the output to constant K ratio. Such calculation can be made with the calculator 36 and the result, or fineness value, be shown on the display 38.

It should be pointed out that the selection of the cutting in times for the chocolate pick-up blades 10 may be made, optionally, manually by acting on timers, or advantageously in the automatic mode, using the electric circuit connected to the load cell 15 and possibly the calculator 36 provided.

It is apparent from the foregoing that with the chocolate feeding and control system according to the invention, the invention object is effectively achieved and the advantages mentioned hereinabove are secured. In particular, the possibility is afforded of directly detecting at will the output and fineness values, and a uniform operation is achieved, or as a consequence, chocolate films are achieved which show a desired fineness in a uniform and smooth fashion. This is made possible by simultaneously operating the various devices which contribute its transferring the chocolate to be refined from the chocolate conveyor to the receiving chamber of the feed rolls, in the sense of making on the one side said transferal as smooth as feasible, and on the other side, of avoiding measuring fluctuations, like in the instance of the capacitive probes.

In practicing the invention, the individual parts may be replaced with other, technically and/or functionally equivalent, ones, without departing from the protection scope of the instant invention.

All of the features apt to be inferred from the description herein, appended claims, and drawing, are considered to be substantial to the present invention, either singly or in any combinations thereof.

The invention claimed is:

1. A chocolate-feeding device for chocolate refiners having a receiving chamber and a pair of feed rollers, a feeding conveyor, a feeding hopper adjacent said conveyor for feeding chocolate to said receiving chamber of the chocolate refiner, and further comprising, in combination, chocolate pick-up means in the form of a single blade disposed above said conveyor and mounted traversally to said conveyor, a slider of the screw nut type carrying said blade, a travel screw mounted substantially parallel to the length of said hopper and receiving said slider, a reversible motor for rotating said screw nut, limit stops for reversal of motion of said blade for loading chocolate in said hopper with alternately deposited superimposed chocolate layers, a bottom closure wall for said hopper, said wall being in form of a swingable shield, a double-acting pneumatic unit connected to said shield to control its opening and closing movements, a cross-member centrally pivoted and supporting said feeding hopper, an electric load call carried by said cross-member to indicate the quantity of chocolate in the hopper, said receiving chamber having a swingable front wall hingedly supported at its upper edge, an external spring biasing said front wall between an inward position corresponding to the minimum level of the chocolate in said chamber and an outwardly-swung position corresponding to the maximum level of chocolate in said chamber, an electric contact between said front wall and said biasing spring effective in the outwardly swung position of said front wall to close a circuit, and a control actuator having a solenoid valve in said circuit effective to control said doubleacting unit connected to said swingable shield of said feeding hopper.

2. A chocolate-feeding device according to claim 1, wherein said chocolate pick-up means comprises two blades supported transversably in relation to the feeding conveyor and spaced apart by a distance equal approximately to one-half the length of said hopper, a cylinder/piston unit connected to each blade to raise said blades alternately for preset time periods such as to result in alternate filling of a first half of said hopper and then a second half thereof.

3. A chocolate-feeding device according to claim 1, in which said pick-up means comprises two spaced-apart blades disposed at a distance less than the length of the feeding hopper, the more remote blade in the chocolate feeding direction spanning the full width of said conveyor and the second of said blades spanning substantially one-half the width of said conveyor, and a slide strip cross support supporting said second of said blades for transverse translation.

* * * * *